Figure 1:
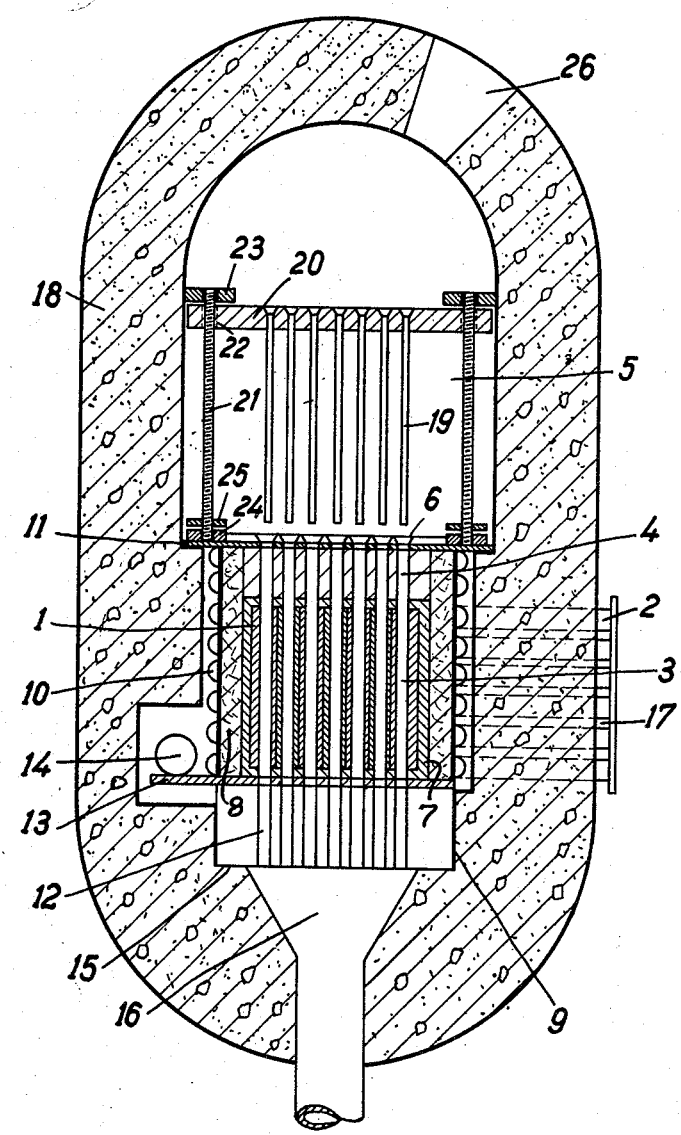

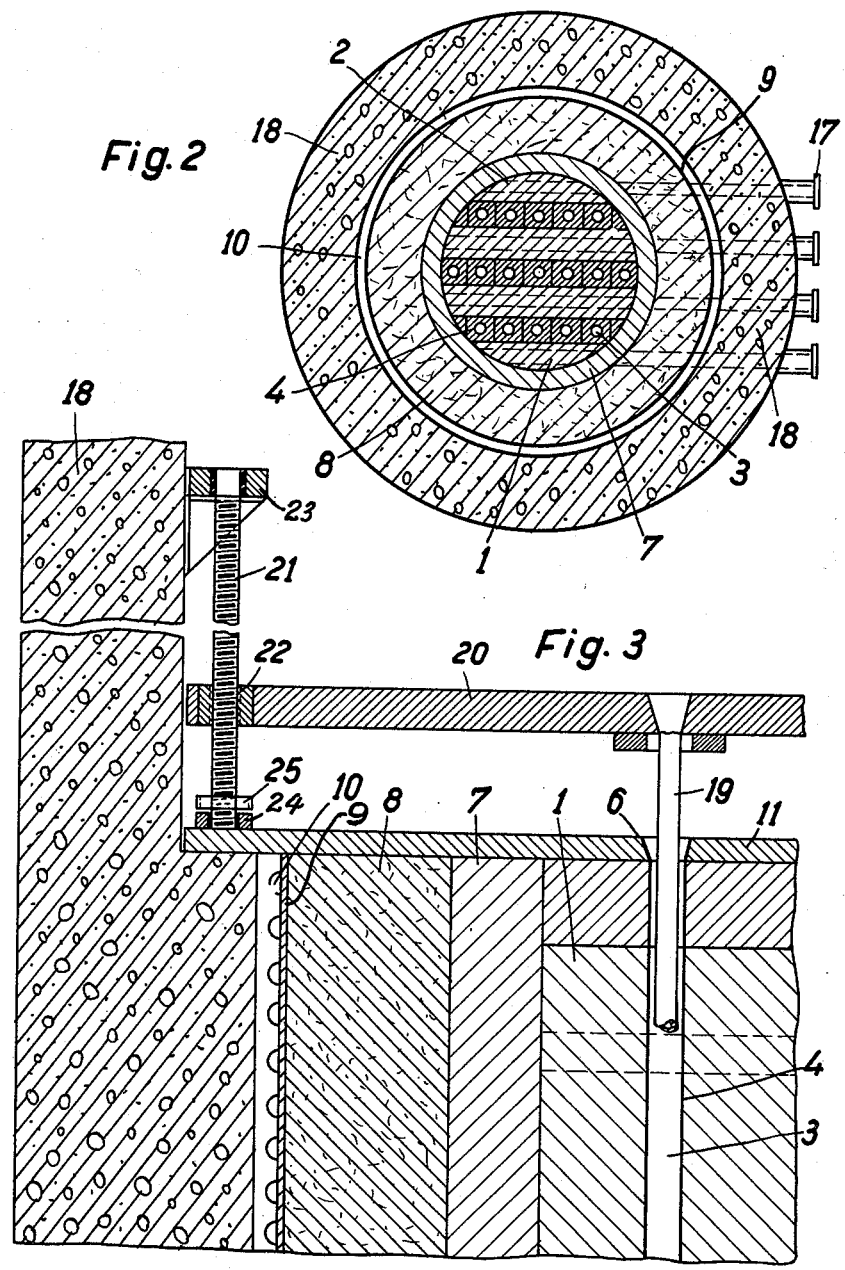

United States Patent Office 3,181,999
Patented May 4, 1965

3,181,999
HEAT TREATING METHOD AND MEANS UTILIZING NUCLEAR ENERGY
Rudolf Schulten, Lutzelsachsen an der Bergstrasse, Germany, assignor to Brown, Boveri & Cie Aktiengesellschaft, Mannheim, Germany, a corporation of Germany
Filed Mar. 23, 1960, Ser. No. 16,979
Claims priority, application Germany, Mar. 24, 1959, B 52,589
2 Claims. (Cl. 176—39)

My invention relates to industrial production methods and means which utilize nuclear-fission energy for the heat processing of materials, such as for melting purposes or performing chemical reactions to produce calcium carbide, phosphorus or other substances, for example.

In the industrial utilization of nuclear-fission energy in nuclear reactors as heretofore known, the evolving reaction energy is imparted as heat to a circulating liquid or gaseous coolant which conveys the heat out of the reaction zone to an extraneous location, for example to a heat exchanger, where the heat is applied to a secondary fluid circulation system. The insertion of the primary coolant circulation serves to prevent radioactivity from being conveyed out of the reactor by the operating medium proper. However, the inserted primary coolant circulation system makes it infeasible to efficiently use a nuclear reactor for physical and chemical reactions that merely require heat processing of the reaction material, particularly at high temperatures. For that reason, the known nuclear reactors have heretofore not been used for such industrial purposes, especially in view of the fact that the zone to be heated by the cooling medium always has a considerably lower temperature than obtaining in the reaction zone of the nuclear reactor core.

It is an object of my invention to provide a method and means for the heat processing of substances in order to perform physical or chemical reactions with the aid of nuclear-fission energy, which affords keeping the technological expenditure within extremely low limits and thus is suitable for production purposes in industry.

To this end, and in accordance with a feature of my invention, the moderator block of a nuclear reactor, preferably the graphite block structure of a thermal-neutron reactor, is operated without a coolant circulation system but is provided, aside from the bores for the nuclear fuel elements, with a number of additional bores for the reception of the substances to be heat-processed, so that the moderator structure directly constitutes the source or storage of the heat active in the processing bores of the moderator structure to perform the desired physical or chemical reaction.

It has been found that various reactions can thus be carried out directly in the reactor core despite the radioactivity obtaining in the core, and that by shutting down the nuclear reaction for the duration of the heat processing of the reaction material, any radioactive contamination of the reaction material can be kept within permissible low limits.

Due to the fact that the only cooling effect upon the core is caused by the material being heat processed, the conventional circulating coolant being absent, the high temperature in the reaction zone can be directly utilized with a minimum of losses and without the need for the considerable expenditures in equipment and space required for the circulation of a coolant through the core.

In other respects a reactor for the purposes of the invention may correspond to the types of reactors known for electric power production or research purposes. The reactor is operated with high-temperature resistant nuclear fuel elements such as available in the form of rods or pellets of enriched uranium.

The above-mentioned objects, advantages and features of my invention, said features being set forth with particularity in the claims annexed hereto, will be apparent from, and will be mentioned in, the following with reference to the embodiment of a heat processing nuclear reactor according to the invention illustrated by way of example on the accompanying drawings, in which:

FIG. 1 is a vertical, sectional view of the reactor,
FIG. 2 a horizontal cross section through the core zone of the reactor, and
FIG. 3 shows in cross section an enlarged detail of a portion of FIG. 1 corresponding to that located at the upper left-hand side of the moderator structure of FIG. 1.

The reaction zone of the illustrated nuclear reactor is filled with a matrix structure 1 of graphite which may conventionally comprise horizontal layers each composed of prismatic blocks or columns of graphite. As will be more fully described, the core structure 1 is provided with nuclear fuel channels and with channels for introduction of the material to be heat processed. The reactor is primarily used and designed as a heat generator or furnace. For that reason, cooling channels and a system for circulating a gaseous or liquid coolant through the core are not present or are not needed for normal operation and hence are not shown on the drawing.

The heat processing is effected by directly utilizing the heat produced by nuclear fission and stored in the graphite core structure 1. There are several ways of proceeding in this manner. One way is to remove, during heat processing, the nuclear fuel elements from the fuel channels of the graphite structure 1 and to fill the reaction material to be processed into additional core channels provided for this purpose. Another way is to leave the fuel elements in operative position within their respective channels while the material is being heat processed in the processing channels. In the latter case the heat processing is effected not only by the heat previously stored in the graphite core structure but also by heat continued to be produced by nuclear fission, the reactor being permitted to continue operating under critical conditions. However the nuclear reaction may also be shut down during heat processing by introducing absorber sleeves or rods into the core. A continued critical operation of the nuclear reactor during heat processing is applicable in cases where such continued operation does not result in objectionable conditions relative to the reaction product. Such objectionable conditions are encountered, for example, if an increased or excessive induced radioactivity of the product is incurred due to the continuing neutron flux. As a rule, it is preferable to perform the heat processing by direct heat exchange with the reactor core while the nuclear activity of the fuel elements is shut down.

A particularly favorable way of performing the method of the invention is for the purpose of chemical endothermic reactions such as exemplified by the production of calcium carbide more fully described hereinafter. Such an endothermic reaction can be performed by first running the nuclear reactor critical under heat-retaining conditions of the moderating reactor core, i.e. without the use of any coolant circulation passing through the core zone. After the desired high temperature of the core is reached, the processing material is introduced in such a quantity as to act substantially as the only coolant with the effect of shutting down the critical reactor operation without necessity of removing the fuel elements. Upon completion of the heat processing, the reactor is returned to critical operation simply by removing the processed material prior to introducing a new quantity.

A particularly favorable design of the reactor core suitable for the modes of operation described above is obtained by providing the graphite structure 1 with at least two groups of channels extending perpendicular to each other and preferably having a circular cross section of the individual channels. One group of these channels serves for receiving the fuel elements, and at least one of the other groups for receiving the reaction material to be heated. In the illustrated embodiment, the channels for the fuel elements are constituted by horizontal bores 2, and the channels for the reaction material by vertical bores 3. Such vertical processing channels are preferable because they permit introducing and discharging the reaction material by gravity, whereas the utilization of gravity effects is less significant relative to the nuclear fuel elements.

The vertical bores 3 are lined with tubes 4 of graphite or beryllium oxide which are preferably used as high-temperature resistant and neutron-moderating substances. The tubes 4 may also be lined with other high-temperature resistant materials known for such purposes and preferably available as nitrides, carbides, silicides or oxides. The lining also serves for protecting the moderator substance, in the present case the graphite, from the fission products. The tubes 4 are extended into a free plenum space 5 above the core zone in order to facilitate introducing the reaction material into the tube entrances, and the upper ends of the tubes 4 are provided with funnel-shaped enlargements 6. Instead of thus extending the tubes 4 into the upper plenum space 5, separate guiding tubes may be coaxially attached to the upper ends of the respective bores 3. If desired, similar guiding tubes, extensions, or funnel portions may be provided for the horizontal fuel bores 2.

The core is enclosed by a reflector 7 which in turn is enclosed by a shield 8. The core space within reflector and shield is covered at the top by a steel plate 11 to which the tubes 4 are fastened. The shield 8 consists conventionally of a mass of graphite dust or graphite granules or the like and serves to shield the environment from the heat as well as the radioactivity of the core zone. For shielding from radioactivity, it is preferable to add substances absorptive to neutrons and gamma radiation, such as boron, boron carbide, iron-barite or the like.

The shield 8 is enclosed within a jacket 9 of sheet steel which forms an additional shield for absorption of gamma rays. Semi-tubes 10 are welded onto the outer peripheral surface of the jacket 9 and, during operation, are traversed by a liquid or gaseous coolant for dissipating the heat penetrating to the outside of the processing structure proper. It will be understood that this coolant system, located externally of the core zone proper, is to be distinguished from the primary coolant circulation system which in the known reactors passes through the fuel channels or through other channels directly in the interior of the moderator core for conveying the developed heat to the outside of the reactor. In contrast thereto, the system of cooling tubes 10 is heat-insulated from the interior of the core and from the fuel elements and essentially constitutes an external protective device.

The above-described components are mounted within an external shield structure 18 of concrete. The reaction material to be processed is supplied through an opening 26 in the top portion of the concrete shield 18 and enters into the plenum chamber 5 in which a feeder device for passing the reaction material into the tubes 4 is located. The feeder device comprises a number of downwardly open tubes 19 mounted on a bridge 20. The tubes 19 are made of a high-temperature resistant material such as beryllium oxide ($BeO_2$) or graphite. The material may also contain an addition of neutron-absorbing substance such as boron, cadmium or hafnium, or the tubes may be lined with such substance, in order to interrupt the nuclear chain reaction during the chemical or physical heat processing of the material, thus preventing the reaction material from becoming activated by photoneutrons.

The bridge 20 is mounted on four screw spindles 21 which are uniformly distributed over the periphery and can be rotated to thereby lower or lift the bridge 20. For this purpose, the bridge 20 is provided with four nuts 22 in threaded engagement with the spindles 21 (FIG. 3). The spindles are journalled in bearings 23 and 24. They are driven by means of respective pinions 25. However the drive may also be effected by means of an endless chain mechanically interconnecting all four spindles 21, or the driving motion may be directly imparted to the spindles by respective gears or motors. In lieu of such a spindle drive, the tubes 19 or corresponding cylindrical feeder structures may also be displaced in parallel motion by synchronously controlled hydraulic pistons or any other suitable drive known for related nuclear-reactor purposes.

The filling of the reaction material onto the bridge 20 is effected in known manner through the opening 26, for example with the aid of a material-distributing spider, if necessary. The best suitable manner and means for thus feeding the processing material into the processing channels depends upon the particular form in which the material is being used, for example in form of granules or rods.

The processed material is discharged through tubes 12 which likewise consist of a high-temperature resistant material such as graphite, $BeO_2$ or alloy steel suitable for such purposes. The tubes 12 are located inside the shield 8 and are fastened to a closure plate 15 of steel. Disposed between each two aligned tubes 4 and 12 is a closure 13 with a drive 14. The closure 13 consists of a planar plate located directly beneath the reflector. The plate 13 has bores of the same diameter and distribution as the tubes 12. The drive 14 consists of a spur gear which engages rack teeth (not shown) of the closure plate 13 for shifting it between open and closed positions. In closed position, the bores of plate 13 are located beside the respective tubes 12. For discharging the reaction material from the core zone, the drive 14 shifts the plate so that the bores in plate 13 register with the respective tubes 12. The reaction material then drains from the channels 3 through the tubes 12 and through a funnel 16 into a transporting vessel or onto a suitable conveyor.

The horizontal bores, like the bores 3, are lined with tubes and provided with flanges and stub pipes 17. The stubs 17 serve for connection to a fuel exchanging device of known type (not illustrated).

The particular embodiment of the heat-processing reactor according to the invention shown on the drawings is particularly designed for operating in such a manner that first the graphite structure 1 is heated up by nuclear-fission energy, and that thereafter the chain reaction is shut down by running the feeder tubes 19 into the reaction zone whereby the reaction material is protected from induced activity and the heat processing is carried out by means of the heat energy stored in the graphite core structure. This method is particularly advantageous for use with reaction substances from which otherwise a higher induced activity due to photoneutrons is to be expected.

For other physical or chemical processing, a shut-down of the chain reaction may not be necessary. In such a case the reactor structure can be simplified considerably. The feeder device can then be omitted and the processing material can directly be entered into the corresponding bores of the graphite core structure. The entire processing operation may also be performed continuously. The conditions for continuous operation follow from the reaction equation and the required dwelling period of the reaction material in the reactor. That is, when the throughput period of the reaction material passing through the reactor is equal to or smaller than the required dwelling period, the plant is suitable for continuous operation.

The plenum chamber above the graphite core structure which, in the illustrated reactor embodiment, contains the feeder device, may also serve as a pre-heating chamber.

When operating the heat-processing reactor intermittently, i.e. when alternately inserting the fuel elements for heating-up of the core zone and thereafter introducing the reaction material for consuming the stored heat, the reactor may also be used in tandem operation with a second reactor of the same type or design. If desired, only one set of fuel elements is then required which is inserted, each time for a given period of time, into one of the respective reactors while the other reactor is being supplied with the reaction material. Upon termination of the processing period, the operations of these two reactors are exchanged relative to each other.

The reactor according to the invention is advantageously applicable as a melting furnace or for performing corresponding chemical reactions such as for producing calcium carbide or phosphorus. Such endothermic processes are particularly suitable to make the processing material operate as a coolant in the interior of the nuclear reactor zone thus reducing the nuclear activity or interrupting the chain reaction while the endothermic chemical reaction is in progress.

The operation of such a melting-furnace reactor will be further described with reference to specific examples.

The production of calcium carbide ($CaC_2$) is in accordance with the reaction equation $$CaO + 3C = CaC_2 + CO$$

This reaction is endothermic and consumes 112 kcal. for forming 1 mol=64 g. carbide. The operating temperature in the nuclear-reaction furnace is about 2200° C. Carbide formation takes place under atmospheric pressure at 1620° C. The industrial mass-production furnaces now being used have a power demand of approximately 25 mw. (megawatt).

The reactor for the processing example here being described is designed for a production of 20,000 metrical tons (t.) of $CaC_2$ per annum. The reactor operates with enriched uranium as fuel in which the ratio of graphite to uranium 235 is such that 1 g. U–235 is present for approximately 10 kg. graphite. The graphite mass of the reactor core structure is approximately 100 t. Hence, the corresponding quantity of U–235 is 10 kg.

According to the reaction equation, $1.75 \cdot 10^3$ kcal. are required per kg. carbide. The graphite structure has a heat storing capacity of $Q = 0.5 \cdot 10^5$ kcal./° C. This results in $Q = 2.5 \cdot 10^7$ kcal. for a temperature difference of $\Delta t = 500°$ C. Based upon these quantitative values the production rate is approximately 14.3 t. per charge.

The charge is filled into 200 bores (3 in FIG. 1) each having a diameter of 12 cm. The total volume of the bores is $V = 7$ m.³ corresponding to 15.4 t. $CaC_2$. Since the heat exchange is effected by radiation, the radiated heat quantity according to the Stefan-Boltzmann law is $Q = 5 \cdot 10^8$ kcal./h.=58 mw. for a temperature $T = 2573°$ K. This 58 mw. reactor therefore affords producing approximately 15 t. of $CaC_2$ in 5.6 hours.

The production of phosphorus is in accordance with the reaction equation:

$$Ca_3(PO_4)_2 + 3SiO_2 + 5C + 282 \text{ kcal.} = 3CaSiO_3 + 5CO + 2P$$

This reaction consumes 282 kcal. for producing 2 moles=62 g. of phosphorus. The operating temperature is 1300 to 1400° C.

Used for the performance of the process is the reactor of the design and rating mentioned above with reference to the production of calcium carbide.

The heat quantity required for producing 1 kg. phosphorus is $4.55 \cdot 10^3$ kcal. With the heat storing capacity of the graphite core structure given above ($0.5 \cdot 10^5$ kcal./° C.) and the temperature difference of $\Delta t = 500°$ C., the quantity of the phosphorus being produced is about 5.5 t. per charge.

The quantities of phosphorite, quartz and coke corresponding to the foregoing reaction equation are inserted into the nuclear furnace in granular form so that P and CO can readily draw off.

The resulting calcium silicate is drained from time to time in form of a liquid slag. The products P and CO evolving from the furnace in gaseous form are passed to a dust separator and subsequently cooled, whereby yellow phosphorus is precipitated.

The carbon monoxide exhausted from the furnace is useful for the purposes of various syntheses by adding $H_2$. A slag suitable for manufacture of cement is obtained when using bauxite in lieu of quartz sand. The ferro-phosphorus resulting as a by-product, due to the iron content of the mixture, is applicable for smelting purposes or can be used for producing alkali phosphates by adding alkali substances.

The phosphorus obtained as a yellow precipitate can be subjected to further fabrication in accordance with conventional single-stage or two-stage methods.

The above-described nuclear-reactor furnace is also well applicable as a melting furnaace for substances which have an extremely high melting point and must be produced in hyper-pure form. For example, quartz glass, titanium, beryllium and the like substances, can be produced in this manner.

While we prefer using for the purposes of the invention a thermal nuclear reactor as exemplified by the illustrated and above-described embodiment, the heat processing according to the invention can also be carried out in a fast reactor in whicch case, on account of the geometric conditions, the chemical and physical production processes must be performed within a blanket structure.

I claim:

1. A process for heat treatment of material for performing a chemical endothermic reaction with the aid of nuclear fission energy to provide the reaction heat, comprising the steps of inserting nuclear fuel elements into a plurality of spaced bores of a graphite reactor moderator block to generate and store heat in said moderator block, retaining said fuel elements in said moderator block until said block reaches a predetermined temperature corresponding to that required for said chemical reaction, removing said fuel elements from said bores, subsequently introducing the material to be treated into spaced bores in said moderator block, and performing said chemical reaction of said material within said block by heating said material directly with heat stored in said moderator block, removing the products of the chemical reaction, re-inserting the fuel elements into said moderator block to re-heat the latter, and repeating the process, said material comprising calcium oxide and carbon, said products of the chemical reaction comprising calcium carbide, and said predetermined temperature being within the range of about 1620° C. to about 2200° C.

2. A process for heat treatment of material for performing a chemical endothermic reaction with the aid of nuclear fission energy to provide the reaction heat, comprising the steps of inserting nuclear fuel elements into a plurality of spaced bores of a graphite reactor moderator block to generate and store heat in said moderator block, retaining said fuel elements in said moderator block until said block reaches a predetermined temperature corresponding to that required for said chemical reaction, removing said fuel elements from said bores, subsequently introducing the material to be treated into spaced bores in said moderator block, and performing said chemical reaction of said material within said block by heating said material directly with heat stored in said moderator block, removing the products of the chemical reaction, re-inserting the fuel elements into said moderator block to re-heat the latter, and repeating the process, said material comprising phosphorite with silicate and carbon substances, said products of the chemical reaction comprising phosphorus.

(References on following page)

References Cited by the Examiner

UNITED STATES PATENTS

| | | | |
|---|---|---|---|
| 2,177,621 | 10/39 | Winter et al. | 23—208 |
| 2,708,656 | 5/55 | Fermi et al. | 204—193.2 |
| 2,743,223 | 4/56 | McClinton et al. | 204—154.2 |
| 2,787,593 | 4/57 | Metcalf | 204—154.2 |
| 2,790,761 | 4/57 | Ohlinger | 204—193.2 |
| 2,796,398 | 6/57 | Cruty | 204—193.2 |
| 2,798,847 | 7/57 | Fermi et al. | 204—154.2 |
| 2,810,689 | 10/57 | Wigner et al. | 204—193.2 |
| 2,863,815 | 12/58 | Moore et al. | 204—154.2 |
| 2,869,990 | 1/59 | Burgess | 23—208 |
| 2,905,610 | 9/59 | Wigner | 204—193.2 |
| 2,917,444 | 12/59 | Dreffin | 204—193.2 |
| 2,954,334 | 9/60 | Stoops et al. | |
| 2,958,637 | 11/60 | Voorhees | 204—193.2 |
| 2,983,658 | 5/61 | Hyman et al. | 204—193.2 |
| 2,992,174 | 7/61 | Edlund et al. | 204—193.2 |

FOREIGN PATENTS

| | | |
|---|---|---|
| 549,785 | 8/56 | Belgium. |
| 782,888 | 9/57 | Great Britain. |

OTHER REFERENCES

Borst abstract, 552, 558, published April 29, 1952, class 99–217, 1 sht. of drawing, 11 pages of specification; abstract in 204–193.2R, Digest D.

Proceedings of the Second United Nations International Conference on the Peaceful Uses of Atomic Energy, vol. 8, United Nations, Geneva, 1958, pp. 278, 279.

Atomic Energy Commission Document LRL–86, "Desiccation Cooling—A Discussion."

REUBEN EPSTEIN, *Acting Primary Examiner.*

CARL D. QUARFORTH, ROGER L. CAMPBELL, *Examiners.*